United States Patent
Shinozaki

(10) Patent No.: US 9,663,010 B2
(45) Date of Patent: May 30, 2017

(54) VEHICLE SEAT

(71) Applicants: TOYOTA BOSHOKU KABUSHIKI KAISHA, Aichi-ken (JP); SHIROKI CORPORATION, Kanagawa (JP)

(72) Inventor: Yushi Shinozaki, Aichi-ken (JP)

(73) Assignees: TOYOTA BOSHOKU KABUSHIKI KAISHA, Aichi-Ken (JP); SHIROKI CORPORATION, Kanagawa (JP)

( * ) Notice: Subject to any disclaimer, the term of this patent is extended or adjusted under 35 U.S.C. 154(b) by 0 days.

(21) Appl. No.: 14/692,107

(22) Filed: Apr. 21, 2015

(65) Prior Publication Data

US 2015/0307007 A1   Oct. 29, 2015

(30) Foreign Application Priority Data

Apr. 25, 2014 (JP) .................. 2014-091071

(51) Int. Cl.
*B60N 2/68* (2006.01)
*B60N 2/06* (2006.01)
(Continued)

(52) U.S. Cl.
CPC ........... *B60N 2/682* (2013.01); *B60N 2/0155* (2013.01); *B60N 2/06* (2013.01); *B60N 2/0715* (2013.01)

(58) Field of Classification Search
CPC ........ B60N 2/06; B60N 2/682; B60N 2/0155; B60N 2/01583
See application file for complete search history.

(56) References Cited

U.S. PATENT DOCUMENTS

2004/0075292 A1* 4/2004 Rausch .............. B60N 2/01541
                                                              296/65.03
2005/0057082 A1* 3/2005 Hatta ................. B60N 2/01583
                                                              297/341
(Continued)

FOREIGN PATENT DOCUMENTS

CN    101224715    7/2008
CN    101522074    9/2009
(Continued)

OTHER PUBLICATIONS

U.S. Appl. No. 14/694,449 to Yushi Shinozaki, filed Apr. 23, 2015.
(Continued)

*Primary Examiner* — Timothy J Brindley
(74) *Attorney, Agent, or Firm* — Greenblum & Bernstein, P.L.C.

(57) ABSTRACT

A vehicle seat includes: a side frame of a seat cushion; a seat support member on a floor side; and a joining bracket that joins the side frame and the seat support member together. The seat support member has at least an upper surface and side surfaces and has a hat shape in cross section in a direction orthogonal to a longitudinal direction of the seat support member. The joining bracket has a fastening surface portion that comes in surface contact with the upper surface of the seat support member and is fastened by a single fastening unit to the upper surface of the seat support member at the fastening surface portion. The joining bracket has at least one projecting portion capable of coming in contact with at least one of the side surfaces of the seat support member.

16 Claims, 7 Drawing Sheets

(51) Int. Cl.
*B60N 2/01* (2006.01)
*B60N 2/015* (2006.01)
*B60N 2/07* (2006.01)

(56) References Cited

U.S. PATENT DOCUMENTS

| | | | |
|---|---|---|---|
| 2006/0138839 A1* | 6/2006 | Ryan | B60N 2/01583 297/340 |
| 2008/0224520 A1* | 9/2008 | Veluswamy | B60N 2/01583 297/335 |
| 2010/0109415 A1* | 5/2010 | Roszczenko | B60N 2/22 297/452.18 |
| 2010/0176628 A1 | 7/2010 | Pywell | |
| 2010/0219674 A1* | 9/2010 | Sakkinen | B60N 2/286 297/452.18 |
| 2010/0270845 A1* | 10/2010 | Wilson | B60N 2/68 297/452.18 |
| 2011/0006574 A1* | 1/2011 | Carroll | B60N 2/01583 297/316 |
| 2012/0007406 A1* | 1/2012 | Yamamoto | B60N 2/065 297/452.18 |
| 2013/0038098 A1* | 2/2013 | Maier | B60N 2/682 297/216.1 |
| 2013/0088066 A1* | 4/2013 | Sasaki | B60N 2/16 297/452.38 |
| 2013/0249265 A1* | 9/2013 | Kaneda | B60N 2/3013 297/340 |
| 2014/0056639 A1* | 2/2014 | Wroblewski | B60N 2/0155 403/327 |
| 2014/0224553 A1* | 8/2014 | Ozawa | B60N 2/002 177/136 |
| 2014/0232163 A1* | 8/2014 | Eckhoff | B60N 2/68 297/452.19 |
| 2015/0091338 A1* | 4/2015 | Hayashi | B60N 2/4435 297/180.1 |
| 2015/0091358 A1* | 4/2015 | Hattori | B60N 2/06 297/452.2 |
| 2015/0129737 A1* | 5/2015 | Oya | B60N 2/0722 248/429 |
| 2015/0136938 A1* | 5/2015 | Kondo | B60N 2/502 248/573 |
| 2015/0307007 A1* | 10/2015 | Shinozaki | B60N 2/06 297/344.1 |
| 2015/0307009 A1* | 10/2015 | Shinozaki | B32B 37/18 297/452.18 |
| 2015/0307011 A1* | 10/2015 | Ushiyama | B60N 2/5825 297/344.1 |
| 2015/0336477 A1* | 11/2015 | Matsui | B60N 2/682 297/344.15 |
| 2015/0375637 A1* | 12/2015 | Kikuchi | B60N 2/12 297/317 |
| 2016/0059739 A1* | 3/2016 | Tsuji | B60N 2/0705 248/429 |

FOREIGN PATENT DOCUMENTS

| | | |
|---|---|---|
| CN | 103042952 | 4/2013 |
| JP | 2011-042221 | 3/2011 |
| JP | 2013-220784 | 10/2013 |

OTHER PUBLICATIONS

Chinese Office Action for CN App. No. 201510201355.1 mailed on Nov. 7, 2016, along with English-language translation thereof.

\* cited by examiner

VEHICLE SEAT

INCORPORATION BY REFERENCE

The disclosure of Japanese Patent Application No. 2014-091071 filed on Aug. 25, 2014 including the specification, drawings and abstract is incorporated herein by reference in its entirety.

BACKGROUND OF THE INVENTION

1. Field of the Invention

The invention relates to a vehicle seat.

2. Description of Related Art

A typical vehicle seat (hereinafter simply referred to as a "seat" where necessary) provided in a vehicle such as an automobile has a seat cushion that serves as a seat portion for an occupant and a seat back that supports the back of the occupant. In addition, seat slide rail mechanisms capable adjusting the position of the seat with respect to a vehicle floor are installed between the floor and the seat as seat support members on the side of the floor. The seat slide rail mechanisms are configured such that upper rails disposed on the side of the seat cushion fit in lower rails disposed on the side of the floor to be slidably movable. Such a vehicle seat is described in, for example, Japanese Patent Application Publication No. 2011-42221 (JP 2011-42221 A) and Japanese Patent Application Publication No. 2013-2220784 (JP 2013-2220784 A).

The seat cushion and the seat slide rail mechanisms of the seat having the seat slide rail mechanisms as described above are joined together when side frames that form the frame of the seat cushion and the upper rails of the seat slide rail mechanisms are joined together by joining brackets. At this time, the joining between the side frames and the joining brackets is typically performed by welding connection, and the joining between the upper rails and the joining brackets is performed by fastening units, each of which is constituted by a bolt and a nut, for example.

The side frames of the seat cushion and the upper rails of the seat slide rail mechanisms may be disposed offset from each other in the width direction (right-left direction) of the seat cushion. That is, the upper rails of the seat slide rail mechanisms may be disposed on the outer side or the inner side of the side frames of the seat cushion.

In a case in which the side frames of the seat cushion and the upper rails of the seat slide rail mechanisms are disposed offset from each other as described above, torsional deformation may be caused in the joining brackets that join the side frames and the upper rails together when an abnormal force due to an external force is applied to the side frames of the seat cushion.

Specifically, when the vehicle is struck by the following vehicle from behind (rear-side collision), a force is applied by the impact of the rear-side collision to the seat of the vehicle to relatively move the seat rearward. The force is also applied to the side frames of the seat cushion and even to the joining brackets joined to the side frames. By the force applied to the joining brackets, the joining brackets are rotated about portions at which the joining brackets are fastened to the upper rails to cause torsional deformation. When the torsional deformation is caused with the rotation of the joining brackets, the side frames are greatly deformed, which negatively affects a rearward tilting angle of the seat. Thus, the seat may sink down as a whole.

As a countermeasure for reducing the torsional deformation of the joining brackets at the rear-side collision described above, fastening units that fasten the joining brackets and the upper rails to each other may be disposed at a plurality of portions. However, disposing the fastening units at the plurality of portions makes the fastening configuration of the vehicle seat complicated correspondingly, which results in an increase in the cost and the mass of the vehicle seat.

SUMMARY OF THE INVENTION

The invention provides a vehicle seat capable of fastening a joining bracket and a seat support member to each other only by a single fastening unit and reducing the relative rotation (torsion) of the joining bracket to the seat support member.

An aspect of the invention relates to a vehicle seat including: a side frame of a seat cushion; a seat support member on a floor side; and a joining bracket that joins the side frame and the seat support member together. The seat support member has at least an upper surface and side surfaces and has a hat shape in cross section in a direction orthogonal to a longitudinal direction of the seat support member. The joining bracket has a fastening surface portion that comes in surface contact with the upper surface of the seat support member and is fastened by a single fastening unit to the upper surface of the seat support member at the fastening surface portion. The joining bracket has at least one projecting portion capable of coming in contact with at least one of the side surfaces of the seat support member. The at least one projecting portion may be formed by extending an end of the joining bracket along the at least one of the side surfaces.

According to the above configuration, the joining bracket has the projecting portion formed to be capable of coming in contact with at least one of the side surfaces of the seat support member. Accordingly, when an abnormal external force is applied to the side frame for causing relative rotation (torsion) of the joining bracket to the seat support member, the relative rotation is restricted. Therefore, even in a case in which the joining bracket is fastened to the seat support member only by the single fastening unit, the relative rotation can be effectively reduced or stopped by the projecting portion. In addition, the projecting portion can be easily formed by extending the joining bracket.

Thus, the configuration of the vehicle seat is simplified, and also the cost and the mass of the vehicle seat can be reduced.

The side frame may be disposed offset from the seat support member inward or outward in a width direction of the seat cushion, the projecting portions may be provided adjacent to the side surfaces of the seat support member, and the projecting portions may be provided at least at positions in a front-rear direction of the vehicle seat, at which rotation of the joining bracket about a fastening portion is restricted, the fastening portion being a portion at which the joining bracket is fastened to the seat support member.

According to the above configuration, even if the side frame is disposed offset from the seat support member inward or outward, the relative rotation of the joining bracket can be reduced or stopped.

The side frame may be positioned on an inner side of the seat support member in the width direction of the seat cushion, and the projecting portions may include an outer-side projecting portion disposed on an outer side of the seat support member in the width direction of the seat cushion, and an inner-side projecting portion disposed on the inner side of the seat support member in the width direction of the seat cushion. In this case, the outer-side projecting portion may be provided extending frontward from a rear end of the fastening portion by the fastening unit in the front-rear direction of the vehicle seat, and the inner-side projecting portion may be provided extending rearward from a front end of the fastening portion by the fastening unit in the front-rear direction of the vehicle seat.

When an impulsive force due to a rear-side collision is, for example, applied to the side frame in a state in which the side frame is positioned on the inner side of the seat support member as in the above configuration, a rearward force is applied to the side frame for causing counterclockwise rotation at the portion at which the joining bracket and the seat support member are fastened to each other. At this time, the projecting portions are set at the positions at which the rotation is restricted. That is, the projecting portion on the outer side of the seat support member is provided extending frontward from the rear end of the fastening portion by the fastening unit, while the projecting portion on the inner side of the seat support member is provided extending rearward from the front end of the fastening portion by the fastening unit. Therefore, the rotation of the joining bracket can be effectively restricted.

The seat support member on the floor side may be an upper rail of a seat slide rail mechanism. Since the upper rail of the seat slide rail mechanism generally has a hat shape in cross section in a direction orthogonal to the longitudinal direction thereof, the upper rail of the seat can be used as the seat support member.

The joining bracket may have reinforcement projections at both end portions in the front-rear direction of the vehicle seat. In addition, the projecting portion may be disposed so as to restrict rotation of the joining bracket relative to the seat support member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, a description will be given, with reference to the drawings, of an embodiment for carrying out the invention. In the embodiment, a vehicle seat provided in an automobile will be described as a typical example of vehicle seats. Note that directions in the following description are directions seen when an occupant sits on a seat. In each figure, the directions are indicated by arrows. In addition, "R" and "L" added to reference symbols are used to distinguish between parts on both right and left sides. Reference symbols with "R" represent the parts located on the right side, while reference symbols with "L" represent the parts located on the left side.

Figure 1:
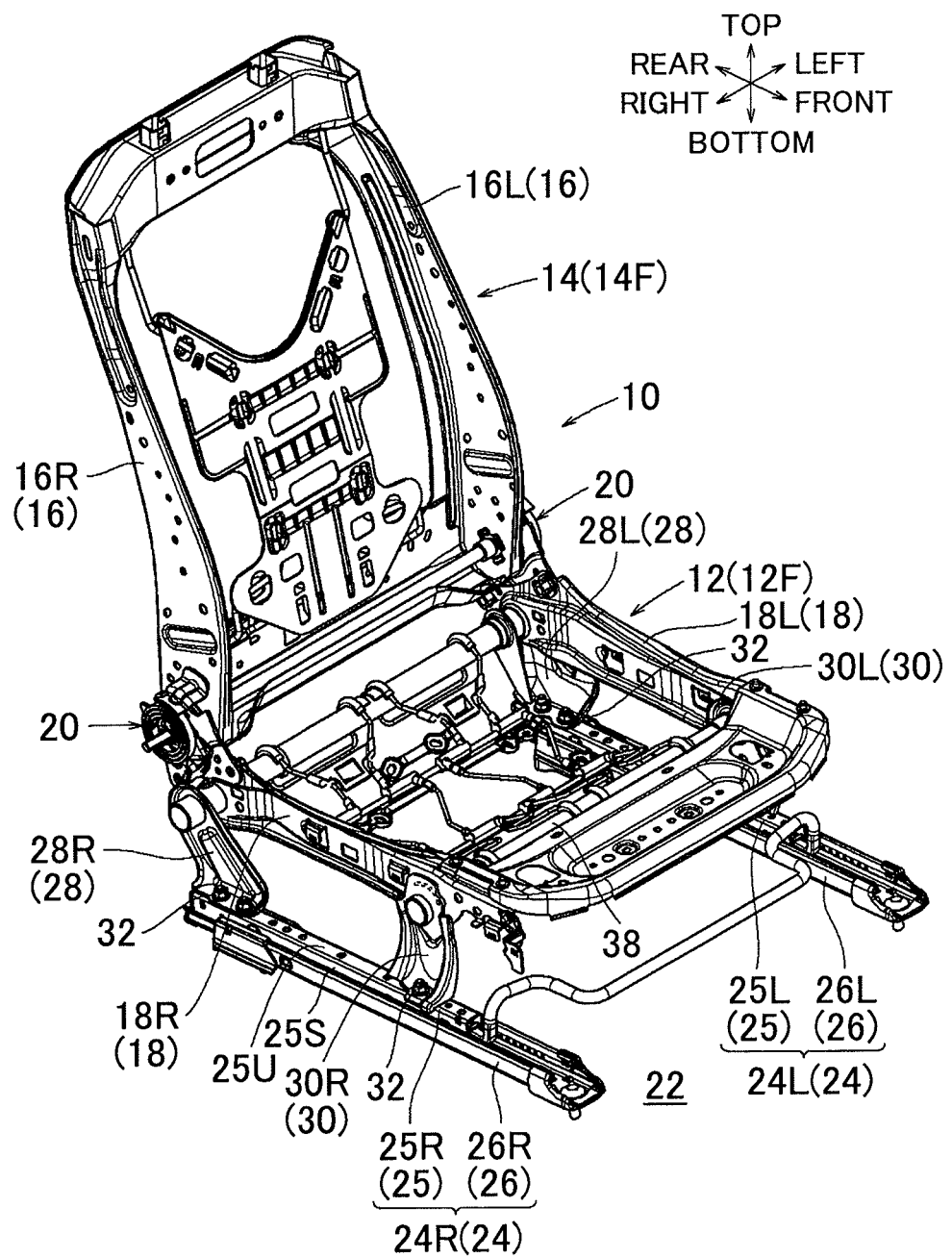
FIG. 1 is a perspective view showing the frame of a vehicle seat according to an embodiment of the invention.

FIG. 1 shows the frame of a vehicle seat 10 provided in an automobile. The vehicle seat 10 has a seat cushion 12 that serves as a seat portion for an occupant and a seat back 14 that supports the back of the occupant. The frames of the seat cushion 12 and the seat back 14 are formed by a cushion frame 12F and a back frame 14F, respectively. The back frame 14F has side frames 16R and 16L on both right and left sides thereof and is formed in a frame shape as a whole. The cushion frame 12F also has side frames 18L and 18R on both right and left sides thereof and is formed in a frame shape as a whole. The seat cushion 12 and the seat back 14 are joined together by reclining mechanisms 20 that join the cushion frame 12F and the back frame 14F together to be rotatable about a shaft. The reclining mechanisms 20 allow the seat back 14 to tilt in a front-rear direction.

On a floor 22 under the side frames 18R and 18L on both right and left sides of the seat cushion 12, seat slide rail mechanisms 24 are disposed. In the embodiment, the seat slide rail mechanisms 24 are disposed slightly offset from the side frames 18 rather than being disposed immediately under the side frames 18. A seat slide rail mechanism 24R on the right side is arranged slightly offset from the right side frame 18R rightward (to the outer side of the seat) in the width direction (right-left direction) of the seat cushion 12. A seat slide rail mechanism 24L on the left side is arranged to be slightly deviated from the left side frame 18L rightward (to the inner side of the seat) in the width direction (right-left direction) of the seat cushion 12.

Each of the seat slide rail mechanisms 24 has an upper rail 25 and a lower rail 26. The lower rail 26 is fixed to the floor 22. The upper rail 25 has an upper surface 25U and right and left side surfaces 25S. Therefore, the upper rail 25 has a hat shape in transverse section. In addition, the upper rail 25 fits in the lower rail 26 to be slidably movable. Note that the transverse section of the upper rail 25 represents a cross section in a direction orthogonal to the longitudinal direction of the upper rail 25R.

The side frames 18 and the seat slide rail mechanisms 24 of the seat cushion 12 are joined together by front and rear joining brackets 28 and 30. Thus, the seat slide rail mechanisms 24 allow the slidable movement of the seat 10 as a whole in the front-rear direction and the adjustment of the arrangement position of the seat 10 with respect to the floor 22 in the front-rear direction. Note that the seat slide rail mechanism 24 (upper rail 25) serves as a seat support member in the embodiment.

Both front and rear joining brackets 28R and 30R provided for the right side frame 18R are disposed on the outer side of the right side frame 18R in the width direction (right-left direction) of the seat. On the other hand, a front joining bracket 30L provided for the left side frame 18L is disposed on the inner side of the left side frame 18L in the width direction (right-left direction) of the seat, but a rear joining bracket 28L provided for the left side frame 18L is disposed on the outer side of the side frame 18L in the width direction (right-left direction) of the seat. Each of the joining brackets 28L, 28R, 30L, and 30R comes in surface contact with the upper surface 25U of the upper rail 25 and fixed by a fastening unit 32 constituted by, for example, a bolt and a nut to be joined to the seat slide rail mechanism 24L or 24R.

Figure 2:
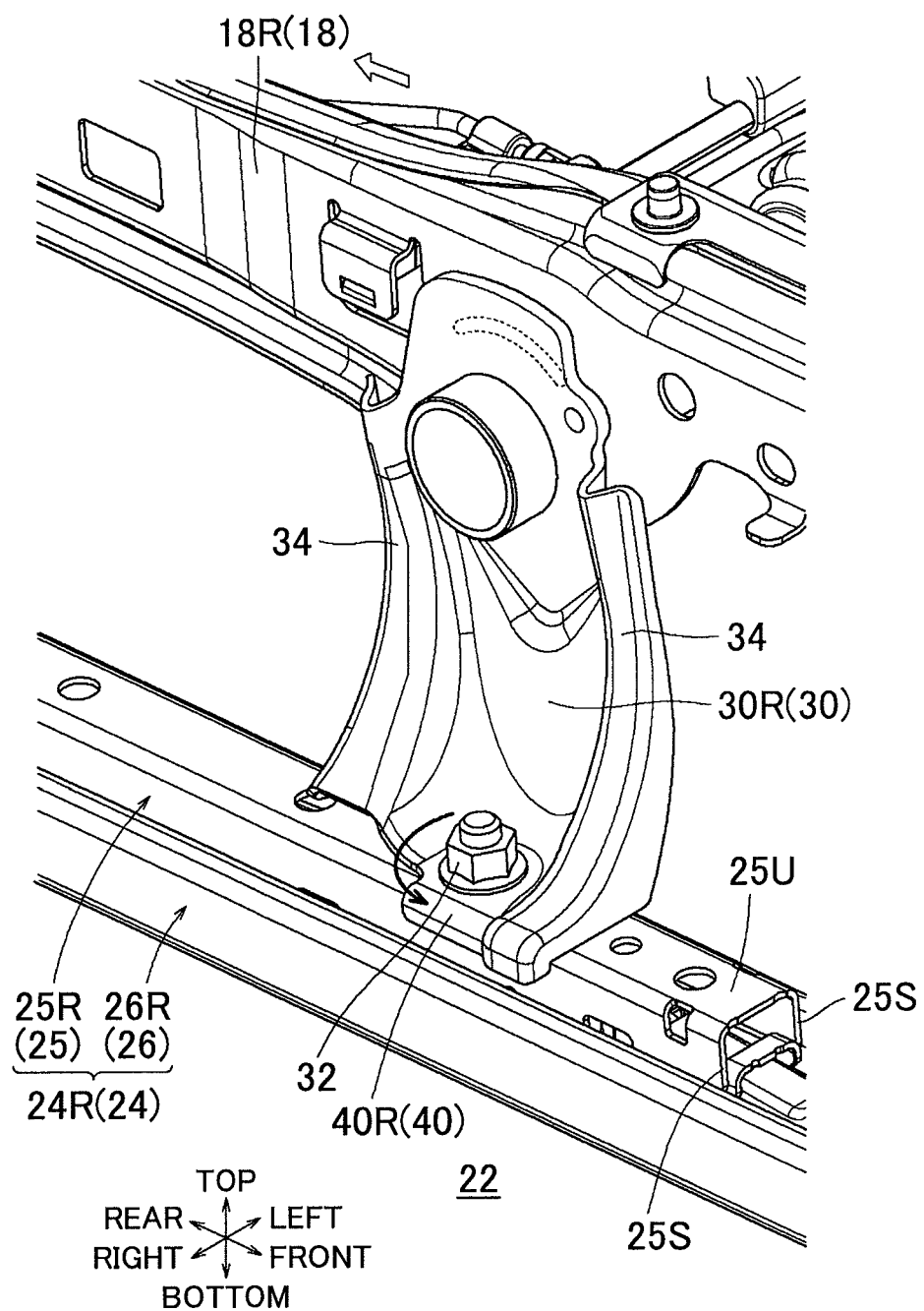
FIG. 2 is a perspective view showing a portion at which the side frame of a seat cushion and a seat slide rail mechanism in FIG. 1 are joined together by a joining bracket.

In the embodiment, the invention is applied to the front joining bracket 30R provided for the right side frame 18R. FIG. 2 is an enlarged view of the front joining bracket 30R when seen from the outer side of the seat, the front joining bracket 30R being provided for the right side frame 18R. In the width direction (right-left direction) of the seat cushion 12, the joining bracket 30R is disposed on the outer side of the side frame 18R. In addition, the portion of the joining bracket 30R, which comes in surface contact with the upper rail 25 of the seat slide rail mechanism 24R, is fastened to the upper rail 25 of the seat slide rail mechanism 24R only by a single fastening unit 32 (fastened only at a single fastening portion). Fastening only by a single fastening unit like this makes it possible to realize a simple fastening configuration.

Figure 3:
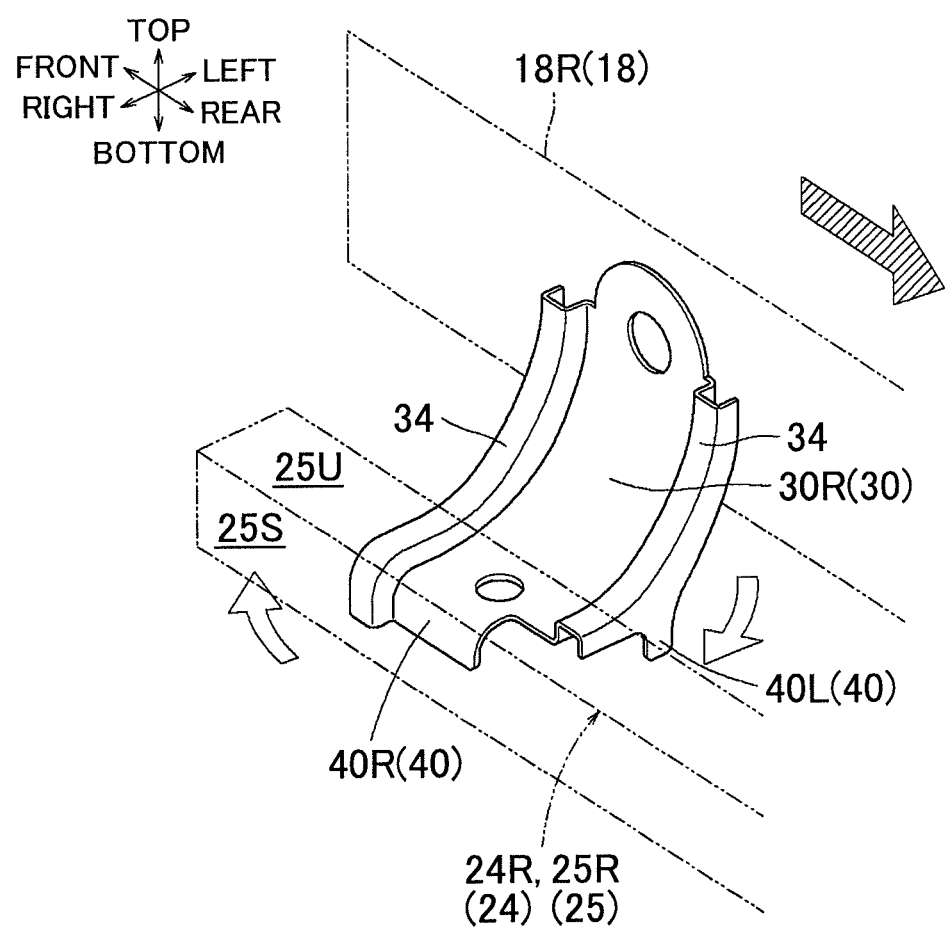
FIG. 3 is a view schematically showing the joining with the joining bracket shown in FIG. 2.

For convenience of explanation, the joining bracket 30R to which the invention is applied will be described with reference to FIG. 3 in which the joining bracket 30R is schematically shown. Note that the front-rear direction of FIG. 3 is opposite to that of FIG. 2. The joining bracket 30R is made of a plate-shaped member and formed in a shape elongated in a top-bottom direction as shown in FIGS. 2 and 3. In addition, the joining bracket 30R is disposed to extend over between the side frame 18R and the upper rail 25R of the seat slide rail mechanism 24. The main body portion of the joining bracket 30R elongated in the top-bottom direction has, on both sides thereof (both end portions thereof in the front-rear direction), reinforcement projections 34 that have a hat shape in cross section (U-shape in cross section). By the reinforcement projections 34, an increase in the rigidity of the whole joining bracket 30R is attained.

As shown in FIGS. 2 and 3, the lower end of the joining bracket 30R is fixed by the fastening unit 32 to the upper surface 25U of the upper rail 25R of the seat slide rail mechanism 24R as described above. As shown in FIG. 2, the upper rail 25R has the upper surface 25U and the both-side surfaces 25S and has a hat shape in the transverse section. The lower end of the joining bracket 30R as a fastening surface portion is disposed to come in surface contact with the upper surface 25U of the upper rail 25R and fixed by the fastening unit 32 to the upper surface 25U of the upper rail 25R.

The lower end of the joining bracket 30R is extended along the right and left side surfaces 25S of the upper rail 25R of the seat slide rail mechanism 24R to form projecting portions 40. In the embodiment, a projecting portion 40R disposed facing (adjacent to) the right side surface 25S of the upper rail 25R is formed extending frontward from the rear end of the fastening portion by the fastening unit 32 in the front-rear direction of the seat. That is, the projecting portion 40R is not formed rearward from the fastening portion by the fastening unit 32. Specifically, the projecting portion 40R is extended rearward from the reinforcement projection 34. On the other hand, a projecting portion 40L disposed facing (adjacent to) the left side surface 25S of the upper rail 25R is formed extending rearward from the front end of the fastening portion by the fastening unit 32 in the front-rear direction of the seat. That is, the projecting portion 40L is not formed frontward from the front end of the fastening portion by the fastening unit 32.

As described above, the projecting portions 40R and 40L are formed at the lower end of the joining bracket 30R and disposed facing the right and left side surfaces 25S of the upper rail 25R, respectively. Therefore, when a rotating force in a counterclockwise direction is caused in the lower end of the joining bracket 30R about the fastening unit 32, the projecting portions 40R and 40L come in contact with the right and left side surfaces 25S of the upper rail 25R, respectively, to restrict the rotation of the joining bracket 30R in the counterclockwise direction. Note that when no projecting portions that restrict the rotation of the joining bracket 30R in a clockwise direction are provided as in the embodiment, the lower end of the joining bracket 30R may be easily attached to the upper rail 25R.

Figure 4:
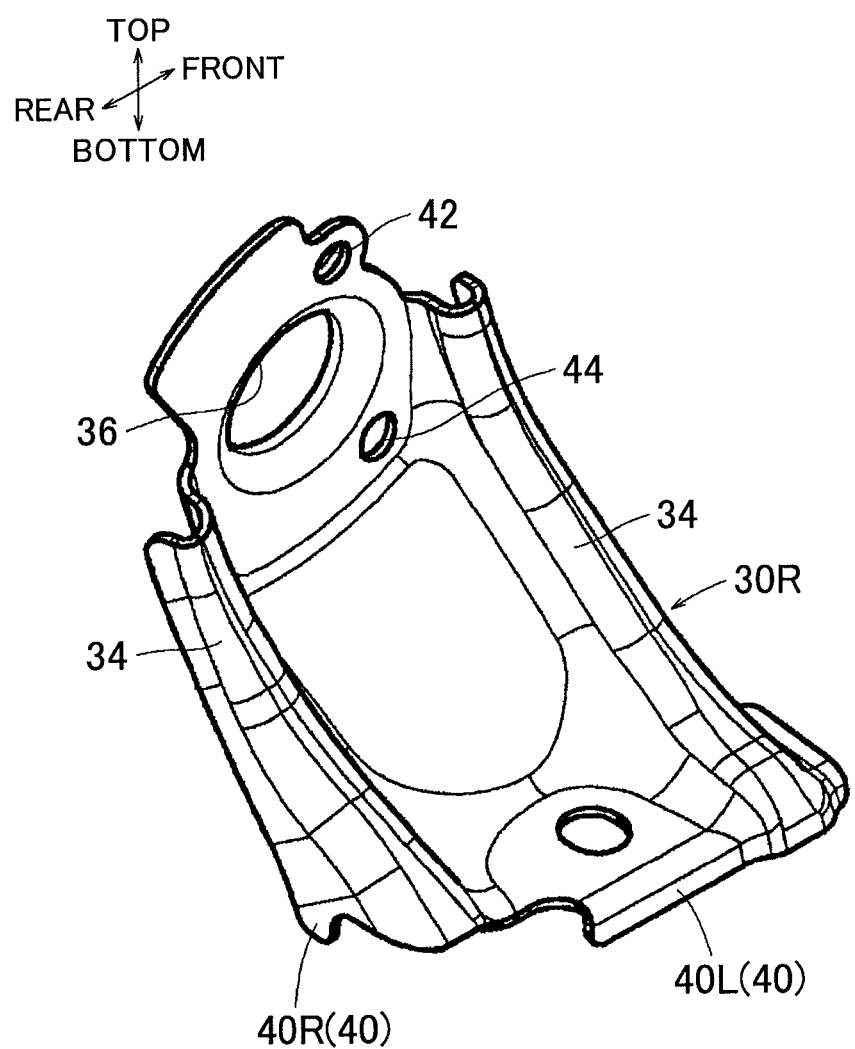
FIG. 4 is a perspective view of the single joining bracket.
Figure 5:
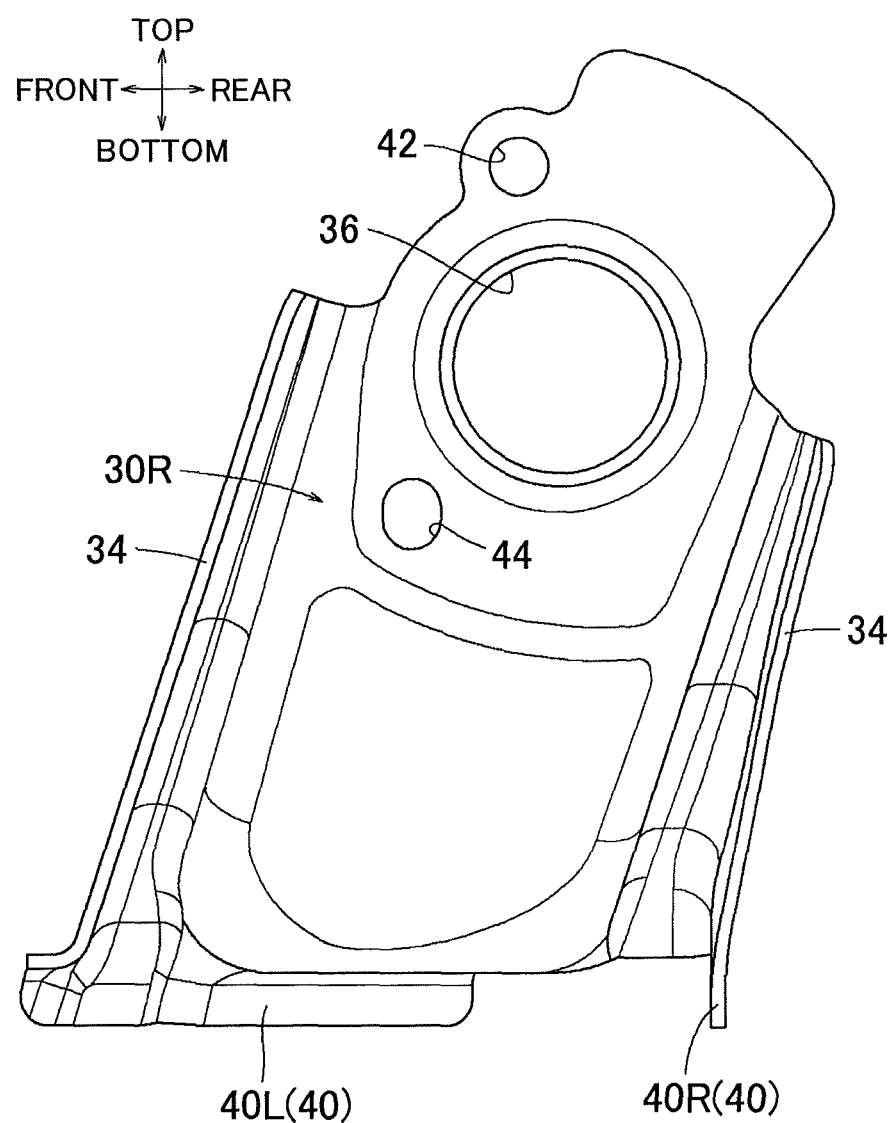
FIG. 5 is a side view of the joining bracket when seen from the inner side of the seat.
Figure 6:
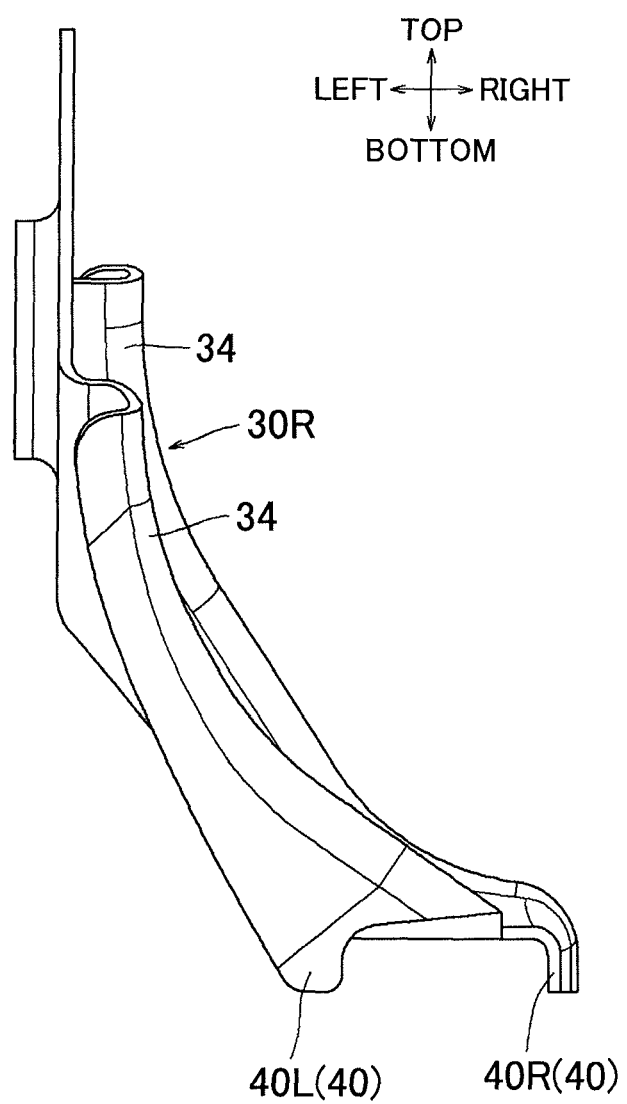
FIG. 6 is a front view of the joining bracket.
Figure 7:
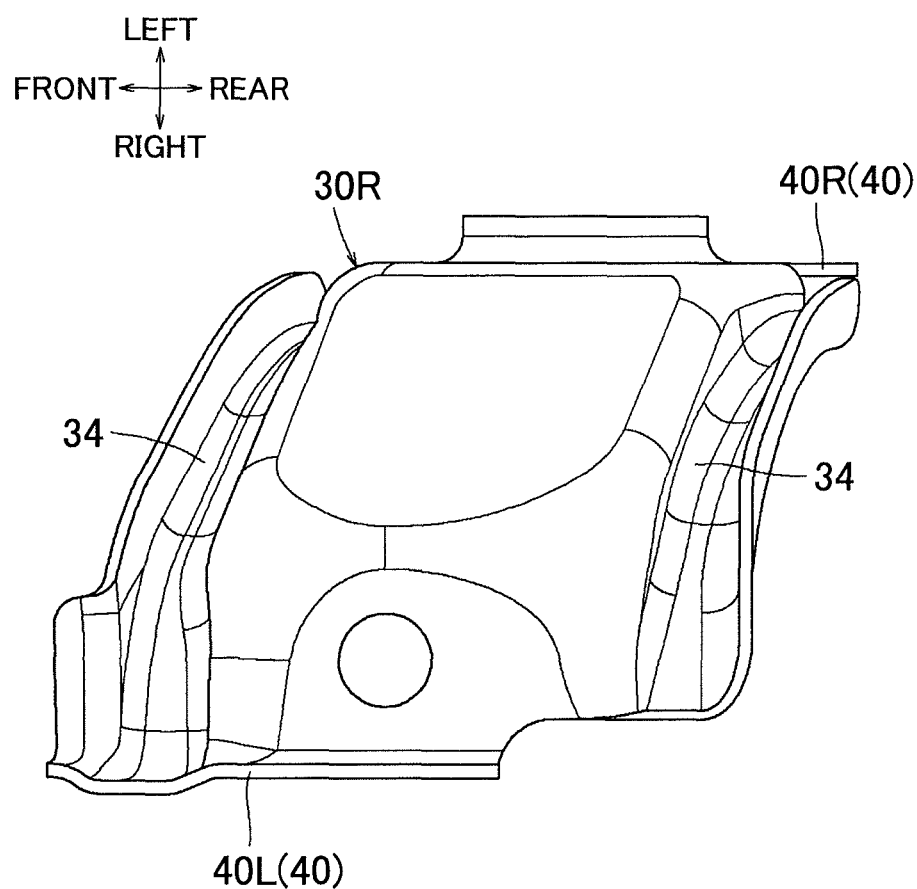
FIG. 7 is a bottom view of the joining bracket.

FIGS. 4 to 7 are views showing the single joining bracket 30R. FIG. 4 is a perspective view of the joining bracket 30R, FIG. 5 is a side view of the joining bracket 30R when seen from the inner side of the seat, FIG. 6 is a front view of the joining bracket 30R, and FIG. 7 is a bottom view of the joining bracket 30R. These figures show the detailed configuration of the joining bracket 30R. As shown in these figures, the joining bracket 30R has a first reference hole 42 and a second reference hole 44 at the upper position thereof. The first reference hole 42 is a hole used to determine the relative position between the joining bracket 30R and the side frame 18R. In addition, the second reference hole 44 is a hole for fixation. Note that the joining bracket 30R has a fitting hole 36 at a substantially central position on the upper side thereof. A shaft 38 bridged between the right and left side frames 18R and 18L fits in the fitting hole 36 to constitute the cushion frame 12F.

In the embodiment, the front joining bracket 30R provided for the right side frame 18R functions as follows. The side frame 18R and the seat slide rail mechanism 24R joined together by the joining bracket 30R are disposed offset from each other. In addition, the lower end of the joining bracket 30R and the upper surface 25U of the upper rail 25R are fastened to each other by the single fastening unit 32. When the automobile having the seat 10 is struck by the following automobile from behind (rear-side collision), an excessive impulsive force is applied to the seat cushion 12 of the seat 10 to relatively move the same rearward. Then, the force is also applied to the side frame 18R. The applied force is force for deforming the joining bracket 30R rearward with the fastening portion between the joining bracket 30R and the upper rail 25R as a supporting point. In the embodiment, the joining bracket 30R is supported by the upper rail 25R only at the single fastening portion, and the fastening portion is positioned offset from the point at which the force is applied from the side frame 18R to the joining bracket 30R. Therefore, the joining bracket 30R starts to rotate about the fastening portion to cause a torsional deformation (that is, torsional force is applied to the joining bracket 30R).

In the joining bracket 30R, the torsional force in the counterclockwise direction is applied to the fastening unit 32 in FIG. 2, and the torsional force in the clockwise direction is applied to the fastening unit 32 in FIG. 3. In the embodiment, the joining bracket 30R has the projecting portions 40R and 40L at the lower end thereof. Therefore, the projecting portions 40R and 40L come in contact with the both side surfaces 25S of the upper rail 25R to restrict (reduce or stop) the rotation, i.e., the torsion of the joining bracket 30R. Thus, the deformation of the joining bracket 30R can be reduced to prevent the sinking of the seat cushion 12 from sinking. In a case in which the joining bracket 30R is deformed by torsion, a change in the position of the joining bracket 30R in the top-bottom direction is great and the sinking of the seat cushion 12 is also great. In this regard, when the joining bracket 30R is deformed only in the front-rear direction, a change in the position of the joining bracket 30R in the top-bottom direction is small and the sinking of the seat cushion 12 is small. In addition, in the embodiment, the deformation of the joining bracket 30R is reduced by the reinforcement projections 34 provided on both sides of the main body portion of the joining bracket 30R.

As described above, the embodiment provides the simple configuration in which the lower end of the joining bracket 30R is fastened only by a single fastening unit to the upper rail 25U of the seat slide rail mechanism 24R and the joining bracket 30R has the projecting portions 40R and 40L at the lower end thereof. Therefore, even if a torsional force is applied to the joining bracket 30R, the rotation of the joining bracket 30R may be reduced or prevented. As a result, the seat cushion 12 can be prevented from sinking at a rear-side collision.

The embodiment of the invention is described above, but the invention may be carried out in various modes other than the above embodiment.

In addition, in the above embodiment, the configuration of the invention is applied only to the front joining bracket 30R provided for the right side frame 18R. However, the invention may also be applied to the joining brackets 28L, 28R, and 30L. Note that in the above embodiment, the side frame 18R and the seat slide rail mechanism 24R offset from each other are joined together by the joining bracket 30R. However, the invention may also be applied to a joining bracket that joins together the side frame 18R and the seat slide rail mechanism 24R not offset from each other.

In addition, in the above embodiment, the fastening unit 32 is constituted by a bolt and a nut. However, the fastening unit 32 may be a general-purpose fastening unit such as a rivet.

The term vehicle may refer to any machine or conveyance that carries people or things from one place to another such as an automobile, a truck, a bus, a train, an aircraft, a boat, a vessel, and a submarine. However, it is noted that these examples are merely provided for purposes of enhancing understanding the present disclosure, and thus should not be construed as limiting.

What is claimed is:

1. A vehicle seat comprising:
   a side frame of a seat cushion;
   a seat support member on a floor side; and
   a joining bracket that fixedly joins the side frame and the seat support member together, wherein
   the seat support member has at least an upper surface and side surfaces and has a hat shape in cross section in a direction orthogonal to a longitudinal direction of the seat support member,
   the joining bracket has a fastening surface portion that comes in surface contact with the upper surface of the seat support member and is fastened by a single fastening unit to the upper surface of the seat support member at the fastening surface portion,
   the joining bracket has at least one projecting portion configured to contact at least one of the side surfaces of the seat support member, and
   the joining bracket has reinforcement projections at end portions of the joining bracket in a front-rear direction of the vehicle seat.

2. The vehicle seat according to claim 1, wherein the at least one projecting portion extends from an end of the joining bracket along the at least one of the side surfaces.

3. The vehicle seat according to claim 1, wherein the side frame is disposed offset from the seat support member inward or outward in a width direction of the seat cushion,
   the at least one projecting portion is provided adjacent to the side surfaces of the seat support member, and
   the at least one projecting portion is provided at least at a position in the front-rear direction of the vehicle seat, at which rotation of the joining bracket about a fastening portion is restricted, the fastening portion being a portion at which the joining bracket is fastened to the seat support member.

4. The vehicle seat according to claim 3, wherein
   the side frame is positioned on an inner side of the seat support member in the width direction of the seat cushion,
   the at least one projecting portion includes an outer-side projecting portion disposed on an outer side of the seat support member in the width direction of the seat cushion, and an inner-side projecting portion disposed on the inner side of the seat support member in the width direction of the seat cushion, and
   the outer-side projecting portion is provided extending frontward from the fastening portion in the front-rear direction of the vehicle seat, and the inner-side projecting portion is provided extending rearward from the fastening portion in the front-rear direction of the vehicle seat.

5. The vehicle seat according to claim 1, wherein the seat support member on the floor side is an upper rail of a seat slide rail mechanism.

6. The vehicle seat according to claim 1, wherein the at least one projecting portion is disposed so as to restrict rotation of the joining bracket relative to the seat support member.

7. The vehicle seat according to claim 1, wherein the at least one projecting portion is continuous with at least one of the reinforcement projections.

8. The vehicle seat according to claim 1, wherein the joining bracket is disposed on an outer side of the side frame in a width direction of the seat cushion.

9. A vehicle seat comprising:
   a side frame of a seat cushion;
   a seat support member on a floor side; and
   a joining bracket that fixedly joins the side frame and the seat support member together, wherein
   the seat support member has at least an upper surface and side surfaces and has a hat shape in cross section in a direction orthogonal to a longitudinal direction of the seat support member,
   the joining bracket has a fastening surface portion that comes in surface contact with the upper surface of the seat support member and is fastened by a single fastening unit to the upper surface of the seat support member at the fastening surface portion,
   the joining bracket has at least one projecting portion configured to contact at least one of the side surfaces of the seat support member, and
   an end face of the at least one projecting portion in a thickness direction contacts the at least one of the side surfaces of the seat support member.

10. The vehicle seat according to claim 9, wherein the joining bracket is disposed on an outer side of the side frame in a width direction of the seat cushion.

11. The vehicle seat according to claim 9, wherein the at least one projecting portion extends from an end of the joining bracket along the at least one of the side surfaces.

12. The vehicle seat according to claim 9, wherein the side frame is disposed offset from the seat support member inward or outward in a width direction of the seat cushion,
   the at least one projecting portion is provided adjacent to the side surfaces of the seat support member, and
   the at least one projecting portion is provided at least at a position in a front-rear direction of the vehicle seat, at which rotation of the joining bracket about a fastening portion is restricted, the fastening portion being a portion at which the joining bracket is fastened to the seat support member.

13. The vehicle seat according to claim 12, wherein the side frame is positioned on an inner side of the seat support member in the width direction of the seat cushion,
the at least one projecting portion includes an outer-side projecting portion disposed on an outer side of the seat support member in the width direction of the seat cushion, and an inner-side projecting portion disposed on the inner side of the seat support member in the width direction of the seat cushion, and
the outer-side projecting portion is provided extending frontward from the fastening portion in the front-rear direction of the vehicle seat, and the inner-side projecting portion is provided extending rearward from the fastening portion in the front-rear direction of the vehicle seat.

14. The vehicle seat according to claim 9, wherein the seat support member on the floor side is an upper rail of a seat slide rail mechanism.

15. The vehicle seat according to claim 9, wherein the at least one projecting portion is disposed so as to restrict rotation of the joining bracket relative to the seat support member.

16. The vehicle seat according to claim 9, wherein the joining bracket has at least one reinforcement projection at at least one end portion in a front-rear direction of the vehicle seat, and
the at least one projecting portion is continuous with the at least one reinforcement projection.

* * * * *